July 1, 1958 F. CUNNINGHAM, JR., ET AL 2,841,785
TARGET SIMULATING SIGNAL GENERATOR
Filed May 8, 1946
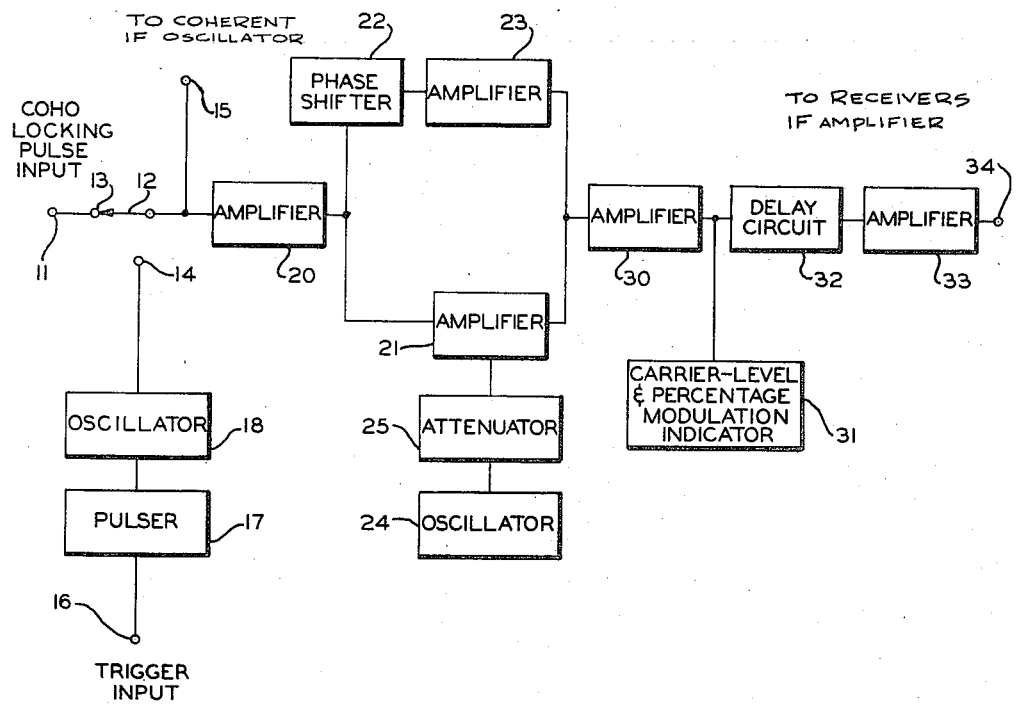
INVENTORS
FREDERIC CUNNINGHAM JR.
WALTER SELOVE
BY
ATTORNEY

United States Patent Office 2,841,785
Patented July 1, 1958

2,841,785

TARGET SIMULATING SIGNAL GENERATOR

Frederic Cunningham, Jr., Belmar, N. J., and Walter Selove, Chicago, Ill., assignors, by direct and mesne assignments, to the United States of America as represented by the Secretary of War Application May 8, 1946, Serial No. 668,029

5 Claims. (Cl. 343—17.7)

This invention relates to signal generators and more particularly to signal generators for testing various characteristics of moving target indication radar systems.

In conventional radar systems, so-called permanent echoes such as those from hills, trees, and buildings frequently prevent the perception of moving objects. Several systems have been devised that distinguish fixed objects from moving objects by the character of the video pulses obtained from object returned echo pulses. Most systems of this character are based upon some method of providing reference oscillations synchronized in phase with respect to the frequency of the transmitted radar pulse, receiving echo-pulses returned from objects, combining these echo-pulses with the aforementioned reference oscillations, and obtaining video pulses from the resultant combination.

The amplitude of the video pulses obtained is a function of the relative phase between the reference oscillations and the phase of the returning echo-pulses. The reference oscillations are generally oscillations at the carrier frequency or the intermediate frequency of the radar system. These oscillations are obtained from a coherent oscillator, hereinafter referred to by the term coho, producing high frequency oscillations. Fixed objects reflect successive echo-pulses always having the same phase with respect to the reference oscillations and hence are evidenced by video pulses having a constant amplitude. Moving objects, on the other hand, reflect successive echo-pulses having a progressive phase shift with respect to the reference oscillations and hence are evidenced by video pulses having a cyclical variation in amplitude. Succeeding circuits then serve to separate the fixed and variable video pulses and pass for presentation only the variable video pulses.

It is therefore necessary that a signal generator capable of being used to test various operating characteristics of the receiver and indicating circuits of a moving target indication radar system, hereinafter referred to as an MTI system, must be capable of producing a signal that is an algebraic combination of a fixed frequency signal of constant amplitude and one being phase and amplitude modulated. In this embodiment of the invention a circuit is proposed that produces a signal output of the same nature as encountered in the input circuit to the receiver of an MTI system for conditions of echoes from stationary targets alone, and also for echoes from stationary and moving targets combined.

A primary object of this invention is to provide a signal generator to produce an amplitude and phase modulated voltage wave output.

Another object of this invention is to provide a signal generator suitable for testing characteristics of receiver and indicator circuits of MTI.

These and other objects will be apparent to those skilled in the art from the following description when taken with the accompanying drawing which is a schematic block diagram of one embodiment thereof.

Referring now to the drawing which shows the application of the present invention to a moving target indicating system of the type wherein coherence between the echo signals and a reference signal is achieved at the intermediate frequency of the radar set, a locking pulse obtained, for example, by heterodyning the transmitted pulse with a stable local oscillator in a mixer circuit is applied to input terminal 11 and in the case where switch 12 is in contact with terminal 13 to the input of amplifier 20 and to terminal 15, which latter terminal is in the input circuit of the conventional coherent I. F. oscillator.

This locking pulse has an I. F. frequency and its application to the coherent I. F. oscillator renders the latter's signal output coherent in phase with each transmitted and received pulse. The output of amplifier 20 is fed to the input of amplifier 21 and also via a 90° phase shifter 22 to a second amplifier 23. Sine wave oscillator 24 provides a synthetic Doppler modulation effect and its output passes through an attenuator 25 to a second input amplifier 21 where it serves to amplitude modulate the I. F. locking pulse passing through this amplifier. The pulse outputs from amplifiers 21 and 23 are combined in amplifier 30 and the resultant summation signal is passed to a carrier-level and modulation percentage indicator 31 and also through a delay circuit 32 and amplifier 33 to the output terminal 34, which terminal is located at a convenient point in the receiver's I. F. amplifying circuit. For cases when it is not desired to use the coho locking pulse from the radar system, switch 12 is changed to make contact with terminal 14. Upon the introduction of a trigger voltage pulse to terminal 16, pulser 17 and oscillator 18 form a short pulse of high frequency oscillations that passes through switch 12 and is used in place of a coho input pulse.

In the operation of this embodiment of the invention with attenuator 25 set for infinite attenuation, the output of amplifier 21 is not amplitude modulated and hence the input to amplifier 30 and therefore the output at terminal 34, is a high frequency pulse having no phase or amplitude modulation, and which is therefore similar to an echo from a fixed target.

With attenuator 25 set so that amplitude modulation appears on the output of amplifier 21, the output of amplifier 23 and amplifier 21 combine to form a phase and amplitude modulated high frequency pulse applied to the input of amplifier 30, which is similar to coincident echoes from fixed and moving targets. Phase shifter 22, which can be a quarter wave line, produces a phase shift of 90° in the signal passing through amplifier 23, and therefore when combined with the amplitude modulated output from amplifier 21, produces phase and amplitude modulation on the amplified coho input pulse. This modulated signal is similar in characteristics to coincident echoes from fixed and moving targets. Delay circuit 32 is included so that the test signal at terminal 34 is applied to the receiver at a convenient time after the pulse at terminal 15. The frequency of sine wave oscillator 24 may be adjusted over a wide range so that tests may be made for effective moving targets having various radial speeds, that is, speeds along a direct line from the MTI antenna to the target.

One of the tests that may be conducted by the use of this embodiment of the invention is the measurement of the subclutter visibility of an operating MTI system. Subclutter visibility is defined as the minimum strength of an echo from a moving target, relative to strong coincident echoes from fixed targets, for detection upon the system's presentation with none of the echoes from the fixed targets appearing upon the presentation. By suitable adjustment of attenuator 25, with the use of modulation-percentage indicator 31 as a calibration device, the amount of modulation required to produce a signal just visible on the system's presentation may be determined. The reciprocal of the percentage modulation required for this is a measure of the subclutter visibility.

The invention described in the foregoing specification need not be limited to the details or uses shown, which are considered to be illustrative of one form the invention may take. The scope of the invention is defined by the appended claims.

What is claimed is:

1. Apparatus for testing moving target indication radar systems comprising, a source of pulsed oscillations, means to feed said pulsed oscillations to the radar received as a locking pulse input, means to apply said pulsed oscillations to two parallel paths, means to shift the phase of said pulsed oscillations in one of said parallel paths by a fixed amount, means to amplitude modulate said pulsed oscillations in the other of said parallel paths, means to combine said phase shifted oscillations and said amplitude modulated oscillations to produce pulsed oscillations having phase and amplitude modulation, means to determine the carrier level and percentage modulation of said amplitude and phase modulated pulsed oscillations, and an amplifier and delay circuit in the output circuit of said phase-amplitude modulated pulsed oscillations.

2. Apparatus for testing moving target indication radar systems comprising, means to obtain pulsed oscillations from the coherent oscillator of said radar system, a source of trigger voltage pulses, a pulse forming circuit adapted to be triggered by said trigger voltage pulses, an oscillator, said pulse forming circuit and said oscillator producing periodically repeated pulses of oscillations, switch means to permit selection of pulsed oscillations from either said coherent oscillator or from said pulsed oscillator, said selected pulsed oscillations being applied to the radar receiver as a locking pulse input, and also amplified and fed into two parallel branches, means to shift the phase of said selected pulse oscillations by ninety degrees in one of said parallel branches, means to amplitude modulate said selected pulsed oscillations in the other of said parallel branches, means to combine said shifted and amplitude modulated pulsed oscillations to form a phase-amplitude modulated oscillation, an indicator to determine the carrier level and percentage modulation of said phase-amplitude modulated oscillatios, an amplifier, a delay circuit, said phase-amplitude modulated oscillations amplified and delayed by said amplifier and said delay circuit, an output terminal, and means to apply said amplified and delayed phase-amplitude modulated oscillations to said output terminal.

3. Apparatus for testing moving target indication radar systems comprising, an input circuit to obtain periodic pulses of oscillation from the coherent oscillator of said radar system, a source of trigger voltage pulses, a rectangular wave voltage pulse forming circuit, a first oscillator, the output of said source of trigger voltage pulses adapted to operate said pulse forming circuits, said pulse forming circuit and said first oscillator producing periodic pulsed oscillations, switching means to permit selection of pulsed oscillations from either said coherent oscillator or from said pulsed oscillator, said selected pulsed oscillations applied to the radar receiver as a locking pulse input, a first amplifier to amplify said selected pulsed oscillations, two parallel circuit paths fed by the output of said first amplifier, a phase shifting circuit and a second amplifier in the first of said parallel paths to shift the output of said first amplifier by ninety degrees and to amplify the phase shifted output of said first amplifier, a third amplifier in the second of said parallel paths adapted to be supplied by the output of said first amplifier, a second oscillator having an adjustable frequency, an adjustable attenuator, said second oscillator and said attenuator adapted to amplitude modulate the output of said third amplifier with any desired frequency and to any desired modulation percentage, a fourth amplifier, the amplitude modulated output of said third amplifier combined with the phase shifted output of said second amplifier producing a phase-amplitude modulated pulsed oscillation input for said fourth amplifier, a carrier level and modulation percentage indicator, a delay circuit to delay the output of said fourth amplifier, a fifth amplifier adapted to amplify the output of said delay circuit, and an output terminal supplied by the output of said fifth amplifier.

4. Apparatus for testing a moving target indication radar system comprising, a source of pulsed oscillations, means for synchronizing the receiver-indicating circuits of said system in phase with said pulsed oscillations, means for shifting the phase of a first portion of said pulsed oscillations by 90 degrees, means for amplitude modulating a second portion of said pulsed oscillations, means for combining said first and second portions to form output signals which are simultaneously phase and amplitude modulated, and means for varying the amount of amplitude modulation applied to said second portion.

5. Apparatus for testing a moving target indication radar system comprising, a source of pulsed oscillations, means for synchronizing the receiver-indicating circuits of said system in phase with said pulsed oscillations, a phase shifter for shifting the phase of a first portion of said pulsed oscillations, an oscillator for generating oscillations at a lower frequency, means for amplitude modulating a second portion of said pulsed oscillations with said lower frequency oscillations, an attenuator for varying the percentage of said amplitude modulation, means for combining said phase shifted first portion of said pulsed oscillations and said amplitude modulated second portion of said pulsed oscillations, means for delaying the transmission of said combined portions and means for applying said combined portions to the receiver of said system.

References Cited in the file of this patent

UNITED STATES PATENTS

| | | |
|---|---|---|
| 1,941,068 | Armstrong | Dec. 26, 1933 |
| 1,950,406 | Hoorn | Mar. 13, 1934 |
| 2,323,534 | Goddard | July 6, 1943 |
| 2,407,887 | Labin | Sept. 17, 1946 |
| 2,420,211 | Tourshou | May 6, 1947 |
| 2,421,016 | Deloraine et al. | May 27, 1947 |
| 2,455,996 | Harvey | Dec. 14, 1948 |
| 2,477,485 | Jacob | July 26, 1949 |
| 2,500,325 | Sanders et al. | Mar. 14, 1950 |
| 2,512,144 | Emslie | June 20, 1950 |